United States Patent [19]

Neefe

[11] 4,400,333

[45] Aug. 23, 1983

[54] PRODUCTION OF OXYGEN PERMEABLE CONTACT LENSES

[76] Inventor: Charles W. Neefe, P.O. Box 429, Big Spring, Tex. 79720

[21] Appl. No.: 327,179

[22] Filed: Dec. 3, 1981

Related U.S. Application Data

[63] Continuation-in-part of Ser. No. 193,704, Oct. 3, 1980, abandoned, which is a continuation-in-part of Ser. No. 171,500, Jul. 23, 1980, abandoned, which is a continuation-in-part of Ser. No. 20,822, Mar. 15, 1979, Pat. No. 4,239,712, which is a continuation-in-part of Ser. No. 972,526, Dec. 22, 1978, Pat. No. 4,202,848, which is a continuation-in-part of Ser. No. 874,934, Feb. 3, 1978, Pat. No. 4,150,073, which is a continuation-in-part of Ser. No. 793,388, May 25, 1977, abandoned.

[51] Int. Cl.$^3$ ............................................. B29D 11/00
[52] U.S. Cl. ..................................... 264/2.7; 264/1.1; 523/107; 526/279; 528/33
[58] Field of Search .................. 523/107; 526/279; 528/33; 351/160 R, 160 H; 264/1.1, 2.7; 525/937

[56] References Cited

U.S. PATENT DOCUMENTS

| | | | |
|---|---|---|---|
| 3,808,178 | 4/1974 | Gaylord | 351/160 H |
| 3,928,294 | 12/1975 | Crawford | 351/160 H |
| 4,235,985 | 11/1980 | Tanaka et al. | 526/279 |
| 4,246,389 | 1/1981 | Le Boeuf | 526/279 |
| 4,277,595 | 7/1981 | Deichert et al. | 526/279 |
| 4,330,383 | 5/1982 | Ellis et al. | 526/279 |

*Primary Examiner*—James B. Lowe

[57] ABSTRACT

This invention relates to a method for correcting visual refractive errors of the human eye. In this method, a contact lens is fitted to the patient's eye, the lens being oxygen permeable, wettable, and having an oxygen permeable crosslinking agent.

3 Claims, No Drawings

PRODUCTION OF OXYGEN PERMEABLE CONTACT LENSES

This is a continuation-in-part of application Ser. No. 193,704, filed Oct. 3, 1980, now abnaboned, entitled: METHOD FOR CORRECTING VISUAL REFRACTIVE ERRORS, COMPOSITION AND ARTICLES USEFUL THEREIN, which is a continuation-in-part of application Ser. No. 171,500, filed July 23, 1980, which is now abandoned, entitled FABRICATION OF PERMEABLE BIFOCAL CONTACT LENSES AND COMPOSITION THEREFORE, which is a continuation-in-part of application Ser. No. 20,822, filed Mar. 15, 1979, entitled: AN IMPROVED METHOD OF MAKING BIFOCAL CONTACT LENSES, now U.S. Pat. No. 4,239,712, which is a continuation-in-part of application Ser. No. 972,526, filed Dec. 22, 1978, entitled: A METHOD OF MAKING BIFOCAL CONTACT LENSES, now U.S. Pat. No. 4,202,848, which is a continuation-in-part of Ser. No. 874,934, filed Feb. 3, 1978, entitled: A METHOD OF CONTROLLING THE ADHESION OF A MOLDED PLASTIC LENS, now U.S. Pat. No. 4,150,073, which is a continuation-in-part of application Ser. No. 793,388, filed May 25, 1977, now abandoned, entitled: A METHOD OF MAKING HIGH QUALITY PLASTIC LENSES.

BACKGROUND OF THE INVENTION

The present contact lenses are of two types: the soft hydrophilic and the hard hydrophilic. The soft hydrophilic lenses are currently made from crosslinked ethylene glycol monomethacrylate. The hard hydrophilic lenses are currently made from polymethyl methacrylate. The soft hydrophilic lenses are kept sterile by boiling because they tend to abosrb antimicrobial agents such as benzalkonium chloride and bind the antimicrobial agents into the lens structure and the lens becomes toxic to the ocular tissue. The hard lenses made from emthyl methacrylate do not absorb these antimicrobia agents and therefore may be stored in and cleaned with solutions containing preservatives such as benzalkonium chloride. Lenses made from methyl methacrylate are very hydrophobic and a wetting agent is required for the water to form a smooth layer on the surface of the lens. If no wetting solution is used, the water will form beads or droplets on the surface and prevent the lens from forming an image. The contact angle for methyl methacrylate is 60° therefore each droplet will contact the lens surface at an angle of 60°. A wetting agent will lower the wetting or contact angle to approximately 30° which is within range of acceptability.

The plastic herein disclosed has a water contact angle of 30° when hydrated. This provides a greater degree of comfort for the wearer and a reduction in surface friction and less foreign body sensation to the eye.

The material is hard and rigid which allows it to be manufactured by the techniques and processes which have evolved over the past twenty years in the contact lens industry. Polishing is the same as polymethylmethacrylate.

Contact lenses that are being used at this time depend upon the flow of lachrymal fluids around the edge of the lens to supply the cornea with its necessary oxygen. The cornea tissue maintains a temperature much lower than the other body tissues. This is due to evaporation at the corneal surface, and the lack of blood supply to the cornea. The temperature of the cornea must be at this lower level or its metabolic processes will be accelerated. The plastic now being used for fabricating contact lenses is a very poor conductor of heat. This insulating material covering a large percent of the corneal area raises its temperature which increases the chemical activity of the metabolic processes and the cornea demands more oxygen. The present lenses preclude the free exchange of atmospheric oxygen dissolved in the precorneal fluid from reaching the corneal tissue. The result is edema and epithelium disorganization.

Lenses have been made with small holes drilled through the lens in an effort to overcome this problem. If the holes are large, they will be seen by the wearer, and if small enough not to be seen, they become clogged with body secretions and are rendered useless.

The new and greatly improved contact lens of this invention overcomes these disadvantages by allowing dissolved gases to pass through the material from which the lens is made.

PRIOR ART

The prior art teaches the use of many different polymeric materials in contact lenses. However, although these polymers possess the optical clarity necessary for corrective lenses, they suffer from other characteristics which reduce their potential utility.

Polymethylmethacrylate is rigid and durable but relatively impermeable to oxygen. The hydrogel materials based on hydrophilic polymers such as polyhydroxyethylmethacrylate are soft and have poor durability. In addition, they provide an environment which is favorable for bacterial growth and are also relatively impermeable to oxygen.

Silicone rubber is soft and resilient and is highly permeable to oxygen. However, due to the low strength of polysiloxanes, a filler which increases the refractive index must be added to improve the durability.

Accordingly, it would be highly desirable to provide a method for correcting visual refractive errors of the human eye in which a contact lens is employed which has increased oxygen permeability, is wettable, has improved mechanical strength, and which is sufficiently rigid to permit precision machining and polishing.

Refractive errors of the eye are corrected with spectacles by changing the angle at which the light enters the cornea by refracting the light with a lens before it reaches the cornea.

Contact lenses correct refractive errors of the eye by replacing the defective corneal curve with the front curve of the contact lens which is calculated to render the eye emmetropic.

THE LENSES ARE MADE AS FOLLOWS

A master positive mold having the curvature required on the finished lens is made from glass, stainless steel or other materials which withstand the molding pressures and temperature. Materials which may be electroplated or plated by vacuum disposition have also been used.

The master positive mold is placed in a sleeve, a molding grade of resinous material such as polyimide, polycarbonate, polymethylpentene, polyethylene polypropylene, or other molding material is also placed in the sleeve. The sleeve and its contents are heated to the softening point of the molding material, pressure is applied to form the negative lens mold. The sides of the master mold have been cut to a smaller diameter than the sleeve to provide an opening around the mold. When sufficient heat and pressure have been applied, the molding compound will fill the area around the positive mold forming a cup-like cavity with a curved optical surface at the bottom. Either injection or compression molding may be used to produce the negative resinous mold. A liquid or syrup monomer material containing a suitable catalyst is placed over the optical surface of the mold and covered to prevent evaporation of the monomer. The liquid monomer is polymerized within the mold to form a solid monolithic mass. Ultraviolet light, microwave energy or heat may be used to speed the polymerization process.

It is not necessary to remove the hardened plastic lens material from the mold before cutting the convex curve. The mold may be placed in a suitable lathe or grinding machine and the second curvature cut and polished. The finished lens now has a molded concave surface and a convex curvature which was cut and polished without being removed from the disposable mold. The mold has served as a container for the monomer and provided the molded optical surface which may be aspheric or may be composed of two or more spherical segments. The cup-like mold also serves as the holding block to facilitate cutting to the required thickness. The thickness of the cup bottom may be measured before adding the liquid monomer and measurements may be taken during the cutting operation and the lens thickness determined by subtracting the thickness of the cup bottom. The mold also serves as a holding fixture during the polishing operation. The lens is supported by the optical surface present on the mold, therefore the lens material must adhere stongly to the supporting mold in order to withstand the forces of cutting and polishing.

PREFERRED EMBODIMENT

The nylon material Amidel, supplied by Union Carbide Corp., is molded by injection molding to provide the required negative optical surface.

The following examples are presented to illustrate the invention but not restricted to the following:

EXAMPLE I

This example demonstrates the polymerization of the novel polymer by use of the 1,1,1-tris(trimethylsiloxy)-methacryloxypropylsilane (TRIS) and the oxygen permeable crosslinking agnet bis(methacryloxypropyl)tetramethyldisiloxane.

A material is prepared by polymerizing 50 parts by weight of 1,1,1-tris(trimethylsiloxy)methacryloxypropylsilane, 40 parts by weight of methylmethacrylate, 3.5 parts by weight of Bis(methacryloxypropyl)tetramethyldisiloxane and 6.5 parts by weight of beta-styrene sulfonate in the presence of 0.25 parts by total weight benzoyl peroxide. The mixture is placed in the mold and placed in a 70° C. water bath for 12 hours and post cured at 85° C. for 24 hours. Contact lenses are fabricated by lathe cutting the convex surface. The lenses are edged by conventional techniques and are hard, transparent, highly oxygen permeable, and wettable.

EXAMPLE II

This example demonstrates the polymerization of the novel polymer by use of the siloxanyl alkyl ester 1,1,1-tris(trimethylsiloxy)-methacryloxypropylsiloxane and the oxygen permeable crosslinking agent Bis(3-glycidoxypropyl)tetramethylisiloxane.

The material is prepared by polymerizing 45 parts by weight of 1,1,1-tris(trimethylsiloxy)methacryloxypropylsiloxane, 45 parts by weight of methylmethacrylate, 5 parts by weight of Bis(3-glycidoxypropyl)tetramethylisiloxane and 5 parts by weight of dimethylaminoethyl methacrylate in the presence of 0.25 parts by weight of benzoyl peroixde. The mixture is placed in the mold and placed in 70° C. water bath for 12 hours, and post cured at 85° C. for 24 hours. Contact lenses are fabricated by lathe cutting and polishing the surfaces. Lenses are edged by conventional techniques and are hard, transparent, wettable, and highly oxygen permeable.

The Silicon crosslinks linkers named above are listed in the Silicon Compounds Register and Review 1979, Petrarch Systems, Inc.

Various modifications can be made without departing from the spirit of this invention or the scope of the appended claims. The constants set forth in this disclosure are given as examples and are in no way final or binding. In view of the above, it will be seen that the several objects of the invention are achieved and other advantages are obtained. As many changes could be made in the above constructions and methods without departing from the scopt of the invention, it is intended that all matter contained in the above description shall be interpreted as illustrative and not in a limiting sense.

I claim:

1. A method of correcting refractive errors of the eye by the steps of copolymerizing 1,1,1tris(trimethylsiloxy)methacryloxypropylsilane and methylmethacrylate monomer with the oxygen permeable crosslinker Bis(-methacryloxypropyl)tetramethyldisiloxane to form an oxygen permeable transparent solid copolymer, cutting and polishing the surfaces of the transparent permeable crosslinked copolymer to form a correcting lens to be worn on the cornea of the eye.

2. A method of correcting refractive errors of the eye by the steps of copolymerizing 1,1,1tris(trimethylsiloxy)methacryloxypropylsilane and methylmethacrylate monomer with the oxygen permeable crosslinker Bis(3-glycidoxypropyl)tetramethyldisiloxane to form an oxygen permeable transparent solid copolymer, cutting and polishing the surfaces of the transparent permeable crosslinked copolymer to form a correcting lens to be worn on the cornea of the eye.

3. A method of correcting refractive errors of the eye by the steps of copolymerizing methylmethacrylate monomer with the oxygen permeable crosslinker Bis(3-glycidoxypropyl) tetramethyldisiloxane to form an oxygen permeable transparent solid copolymer, shaping the transparent permeable crosslinked copolymer to form a correcting lens to be worn on the cornea of the eye.

* * * * *